United States Patent [19]

Demairé et al.

[11] 4,310,396
[45] Jan. 12, 1982

[54] METHOD FOR DESALINATION OF WATER, IN PARTICULAR SEA WATER

[75] Inventors: Georges Demairé, Bonnelles; Jacques Lys, Versailles; Michel Berger, Meze, all of France

[73] Assignee: Societe d'Etudes et de Recherches en Sources d'Energie Nouvelles (SERSEN), Bonnelles, France

[21] Appl. No.: 201,385

[22] PCT Filed: Nov. 30, 1979

[86] PCT No.: PCT/FR79/00119

§ 371 Date: Jul. 31, 1980

§ 102(e) Date: Jul. 31, 1980

[87] PCT Pub. No.: WO80/01161

PCT Pub. Date: Jun. 12, 1980

[30] Foreign Application Priority Data

Dec. 1, 1978 [FR] France .................... 78 34004

[51] Int. Cl.³ .................... C25B 1/28; C02F 1/46
[52] U.S. Cl. .................... 204/151; 204/82; 204/95; 204/149; 204/152; 204/DIG. 3; 204/DIG. 4; 429/199
[58] Field of Search ............ 204/149, 152, 98, 128, 204/82, 95, DIG. 3, DIG. 4; 429/199, 206, 207

[56] References Cited

U.S. PATENT DOCUMENTS

| | | | |
|---|---|---|---|
| 512,567 | 1/1894 | Stine | 429/119 X |
| 666,387 | 1/1901 | Kynaston | 204/DIG. 3 X |
| 2,584,824 | 2/1952 | Vanharen et al. | 204/DIG. 3 X |
| 3,020,124 | 2/1962 | Bravo et al. | 204/82 X |
| 3,114,686 | 12/1963 | Edwards et al. | 204/128 X |
| 3,493,478 | 2/1970 | Udupa et al. | 204/95 X |
| 3,518,173 | 6/1970 | Crane | 204/82 X |
| 3,883,412 | 5/1975 | Jensen | 204/149 |
| 3,884,777 | 5/1975 | Harke et al. | 204/82 X |
| 3,940,283 | 2/1976 | Symons | 429/119 X |
| 3,986,951 | 10/1976 | Fremont | 204/152 X |
| 4,218,315 | 8/1980 | Hartkorn | 204/149 X |
| 4,224,121 | 9/1980 | Dempsey et al. | 204/DIG. 3 X |

*Primary Examiner*—Arthur C. Prescott
*Attorney, Agent, or Firm*—Oblon, Fisher, Spivak, McClelland & Maier

[57] ABSTRACT

A method for desalination of sea water using a main electrochemical generator which has an anode compartment through which the water to be desalinated is fed and which causes formation in the solution of chlorates and perchlorates, removal of the latter being effected by a potassium salt such as potassium bicarbonate. The insoluble matters are separated from the solution, while the residual salts dissolved therein are oxidized at the anode of secondary electrochemical generator(s), under the form of persalts apt to be precipitated and removed by settling or filtration. The insoluble matters obtained at the various stages of this treatment can be decomposed by heating or electrolysis or under the action of a strong acid such as hydrochloric acid. The power consumed during desalination may be wholly or partly supplied by the above mentioned main electrochemical generator and secondary electrochemical generators.

This method may be used to provide fresh water for agricultural, industrial or domestic purposes.

5 Claims, 1 Drawing Figure

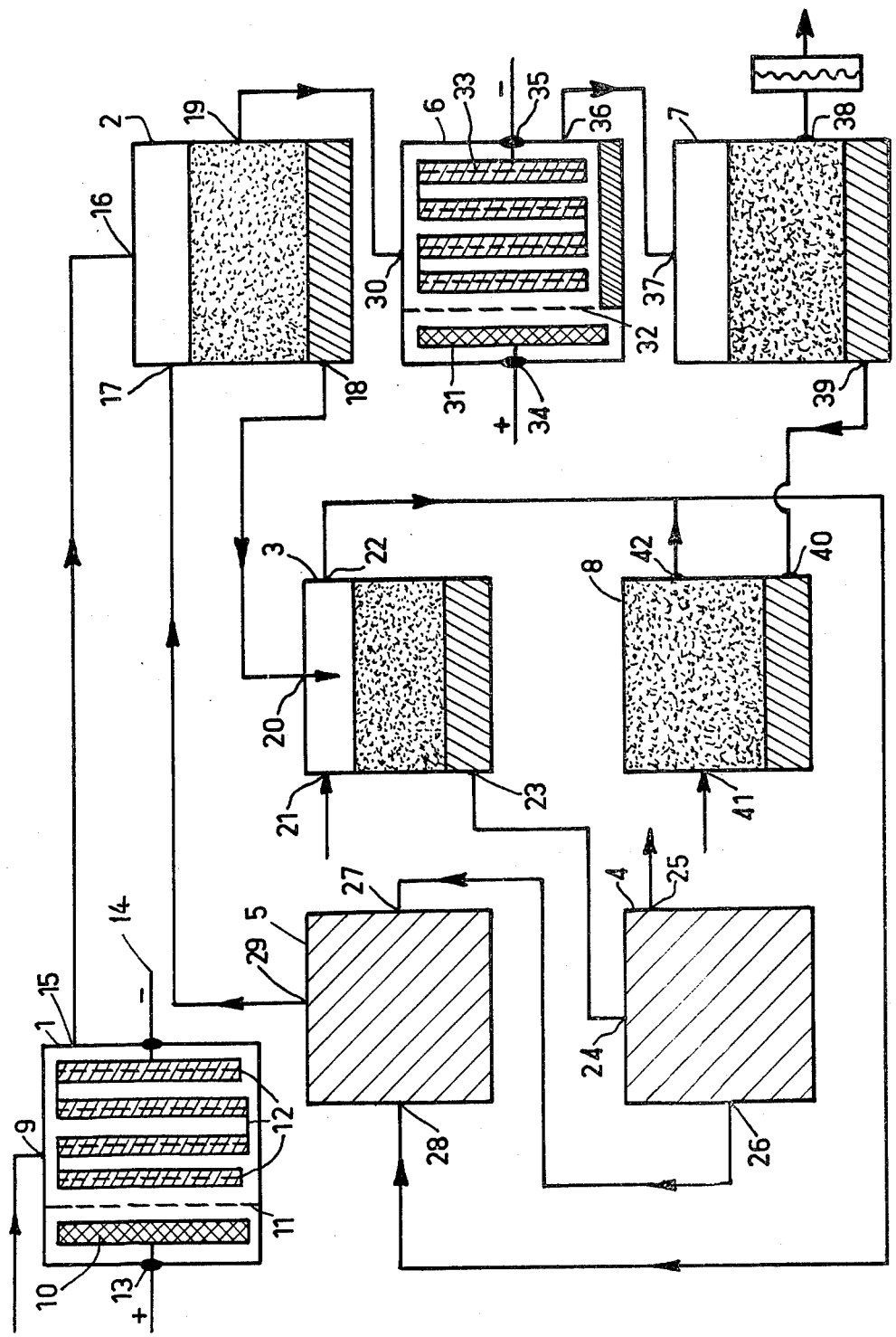

METHOD FOR DESALINATION OF WATER, IN PARTICULAR SEA WATER

The present invention relates to the desalination of water, in particular sea water.

The methods generally used to separate water and mineral salts in solution therein are based on various principles including mainly, phase conversion by freezing or evaporation, filtration by electrodialysis or reverse osmosis, etc.

These methods are attended, as the case may be, by various drawbacks. Firstly, they may involve high energy consumption. Moreover, if they use filtration membranes, the latter must withstand high pressures and this can lead to technological problems and limit the plant capacity. Finally, if desalination is effected by distillation, the water obtained after treatment fails to be of optimum quality, as far as it is wholly demineralized.

This invention relates to the use of a novel desalination method which will bring forth a particularly favorable power balance, can be carried out in a simple manner, relatively unexpensive as compared with the conventionnally used methods, will lead to treatment residues valuable in various fields of chemical industry and will eventually provide to the user water free from dissolved chlorides.

The method provided by the present invention comprises electrochemical oxidation, in the cold state, of the chlorides dissolved in the water, followed by a chemical treatment intended to effect removal of the perchlorates resulting from the oxidation step set forth above.

The electrochemical oxidation of the chlorides in solution in the water is carried out within an electrochemical generator under the action of $OH^-$ ions which, since they are negatively charged and in contact with a chloride, e.g. sodium chloride molecule, will release a negative electric charge according to a reaction of the type:

$$ClNa + 8OH^- \rightarrow ClO_4Na + 4HOH + 8e^-$$

From this expression, it is apparent that one gram molecule of, for instance, sodium chloride, will thus be oxidized into one gram-molecule of sodium perchlorate, while 8 gram-electrons are released at the anode through an auxiliary electrode immersed in the solution and connected to an external electric circuit. It is to be pointed out that this process will generate electric power. Production of $OH^-$ ions in the solution to be desalted can be effected by methods similar to those used in electrochemical batteries and generators. A positive electrode (cathode) whereof the reactive materials consist of nickel oxide, titanium oxide, cobalt oxide, iron oxide or other oxides, either singly or in combination, will supply after hydroxidation in an alkaline electrolyte such as a soda or potash solution, $OH^-$ ions which migrate through a separator formed of a ion-permeable membrane and reach the anode, where the above mentioned electrochemical reaction occurs.

Various improvements to the general method just described are possible. In particular, by adding to the electrolyte wherein the cathode is immersed various compounds such as lithium hydroxide, the solution conductivity can be increased. In every case, regeneration of the reactive substances forming the cathode can be effected in contact with ambient air or oxygen, or by a forced oxidation caused by air or oxygen under pressure blown into the cathode compartment and dissolved therein.

The water to be desalinated is fed through the anode compartment and brought into the closest possible contact with the separator through which the $OH^-$ ions are migrating, as well as with the auxiliary electrode which acts to collect the electrons and which may be made, for example, of expanded, rolled or sintered nickel.

Total depletion of the water to be desalinated, i.e. cold oxidation of all the chlorine ions dissolved therein, may require several successive runs through the same unit or subsequent runs through several similar units wherein the above set forth chemical reaction takes place, the purpose being to provide the largest possible contact area between the water to be desalinated, the separators and the auxiliary electrodes used.

When said reaction is completed, the dissolved chlorides are oxidized into perchlorates, most of these compounds being soluble at normal temperature and pressure.

The method according to the invention is based, besides, on the removal of the perchlorates produced at the preceeding stage.

As a matter of fact, the desalination procedure used is based on the insolubility of potassium perchlorate.

The water to be desalinated, in the particular case of sea water, contains mainly in solution therein, after the above-described electrochemical treatment, sodium and potassium perchlorates and, at lower concentrations, magnesium and calcium perchlorates. Any potassium perchlorate formed during the previous electrochemical treatment can be directly extracted by mere decantation or filtration, due to the fact that is is insoluble in water at normal temperature and pressure. If the solution to be desalinated is added, after the above electrochemical treatment, with a potassium salt, e.g. potassium bicarbonate in slight excess, then the perchlorates in solution will be decomposed according to chemical reactions of the following type:

$$ClO_4Na + CO_3HK \rightarrow ClO_4K + CO_3HNa$$

These reactions are irreversible to a quite marked degree in as much as they lead, by double decomposition, to an insoluble compound, viz potassium perchlorate.

The removal of the insoluble products to be effected after the above-indicated treatments can be accomplished by decantation or filtration, or any other process allowing separation of the coexistent phases. The above-described steps for removing chlorine ions may be repeated in alternating sequence until a sufficiently purified solution is obtained. In short, the obtention of a chloride-free water is based on using an electro-chemical generator for sea water, then treating the solution by a potassium salt such as potassium bicarbonate.

Removal of the alkaline and metal ions remaining in solution can be effected, at a second stage of the process, by a further electrochemical treatment similar to that described above and applied by conveying the solution to the anode of a further electrochemical generator including a source of $OH^-$ ions, a separator and an auxiliary electrode for electron collection. The purpose of this generator is to cause electrochemical oxidation of salts such as the alkaline and metal bicarbonates still in solution after the chemical treatment described above, according to reactions of the type:

$$2CO_3HNa + 2OH^- \rightarrow C_2O_6Na_2 + 2H_2O + 2e^-$$

and wherein the $OH^-$ ions will ensure oxidation of e.g. the bicarbonates into perdicarbonates, the formation of which is attended by production of a precipitate liable to be separated by decantation or filtration.

In the case of sulphates present at a low concentration, and initially contained in the sea water, or formed during the previous treatments, these can also be precipitated at this second stage of electrochemical process under the form of persulphates apt to be settled and separated from the solution to be desalinated.

Formation of these various persalts at the cathode of the electrochemical generator and precipitation thereof in the solution to be desalinated is all the more rapid as the temperature is lower.

With a view to limit to the lowest possible levels the consumption of potassium bicarbonate involved in the above-described desalination stages, the method of the invention also includes the possible steps of recovering and treating the precipitates obtained after settling, filtration and separation of the coexistent phases. Should the potassium salt used in the chemical treatment be potassium bicarbonate, then the residues obtained will consist mainly, on the one hand, of potassium perchlorate derived from the first stage of the process and, on the other hand, of percarbonates formed at the second stage of the process.

The recovered potassium perchlorate can be directly used in all applications requiring a strong comburent. In particular, it may be used in the formulation of gunpowders, explosives and missile-propelling agents. It can also be decomposed by heating and by electrolysis, the thus obtained decomposition products being themselves valuable. In fact, heating of a concentrated perchlorate solution leads to partial decomposition thereof and formation of potassium chloride, electrolysis of the latter leading in turn to the formation of caustic potash KOH. Reaction of carbon dioxide with potash will produce the potassium bicarbonate involved in the above described chemical treatment.

The persalts recovered by settling and filtration after the above described second stage of the desalination process can also be used to form part of the carbon dioxide required for preparing the potassium bicarbonate involved in the previously described chemical treatment. As a matter of fact, decomposition of the perchlorates by heating, then reaction with hydrochloric acid, for example, will cause the formation of carbon dioxide which can be combined with the otherwise produced potash.

FIG. 1 is a flow chart of the water desalination process according to the invention.

In one embodiment of the corresponding apparatus, the sea water to be desalinated is admitted at 9 into the cell 1 wherein the chlorides dissolved in said water are subjected to electrochemical oxidation. Cell 1 includes a cathode 10 immersed in an alkaline electrolyte, a separator 11, an auxiliary electrode 12 which is immersed in the solution to be desalinated and acts to collect the anodic electric current.

The electrochemical generator formed by cell 1 delivers to its terminals 13 and 14 the electric current produced. The solution to be desalinated is discharged at 15 from cell 1 and may be successively admitted in several cells similar to cell 1, which are not shown in FIG. 1. The solution to be desalinated is thereafter admitted at 16 in the chemical treatment cell 2. Said cell 2 is fed at 17 with a concentrated potassium bicarbonate solution. The precipitates resulting from the double decomposition chemical reaction are separated by settling at 18 and possibly by filtration or any other phase separation method, not shown in FIG. 1. Thus, the water discharged at 19 from cell 2 is a chloride-free water. The treatment for recovering the potassium perchlorate which constitutes the main residual compound obtained at 18 is effected as follows. The precipitate collected at 18 is fed at 20 in cell 3 and treated with hydrochloric acid admitted at 21 in cell 3. Said acid acts to decompose the carbonates and bicarbonates present in said precipitate and to form carbon dioxide, which is withdrawn at 22 from cell 3. The potassium perchlorate and residual chlorides collected at 23 in cell 3 are fed, to be decomposed by heating, to a cell not shown in FIG. 1. The resulting compounds are admitted at 24 in the electrolysis cell 4.

The electrolysis decomposition products are chlorine and hydrochloric acid recovered at 25 and, on the other hand, potash KOH withdrawn at 26, as well as various insoluble metal hydroxides. After filtration, the potash KOH is introduced at 27 in cell 5 which is simultaneously fed at 28 with the carbon dioxide withdrawn at 22 from cell 3 and at 42 from cell 8. The potassium bicarbonate issuing at 29 from cell 5 is used in cell 2, to which it is fed at 17.

The chloride free water obtained at 19 at the output from cell 2 may be used as such after settling and filtration or, if required for some specific uses, it may be further purified by removal of the alkaline and metal ions still present in solution therein. This additional desalination step is effected in cell 6, which is fed at 30 with the solution to be desalinated and includes, just as the electrochemical generator forming cell 1, a cathode 31 immersed in an alkaline electrolyte, a separator 32, an auxiliary electrode 33 immersed in the solution to be desalinated and acting to collect the anode current. The electrochemical generator consisting of cell 6 delivers to its terminals 34 and 35 the electric current produced. The solution to be desalinated is discharged at 36 from cell 6 and possibly treated in several cells identical with cell 6, which are not shown in FIG. 1. After this treatment, a final solution settling or filtration stage is effected in cell 7, where the solution is admitted at 37. The desalinated water is discharged at 38 from cell 7.

The persalts which are formed during this final stage of the treatment and precipitated are withdrawn at 39 from cell 7 and fed at 40 to cell 8, then subjected to heating and decomposition by hydrochloric acid admitted at 41.

The carbon dioxide resulting from said decomposition is collected at 42 and conveyed to cell 5, wherein there occurs chemical synthesis of the potassium bicarbonate used in the chemical treatment effected in cell 2.

In brief, there is thus obtained a slightly mineralized water issuing at 38 from this apparatus.

The method of the invention allows continuous treatment of substantial saline water throughputs which are only limited by the capacity of the cells effecting the electrochemical reactions for oxidizing the salts contained in the water. A treatment capacity of several tens of thousands cubic meters by day of water to be desalinated is made possible according to the above described process.

Part of the operating power required for the system, especially for ensuring the heating and electrolysis steps as well as the pumping and transport steps of the fluids and other compounds, may be supplied by the electrochemical generators constituting the cells 2 and 6 of FIG. 1. If the electric power produced in the latter is not consumed to meet the power requirements of the other cells, said power can be used, after suitable conversion, to feed an external electric network, the powers evolved being in the range of about 5–10 watthour by liter of sea water to be desalinated.

Moreover, if an additional amount of carbon dioxide proves to be necessary at various stages of the process, the latter can be supplied by combustion of coke or any other suitable fuel.

Finally, the residues obtained at the various stages of the process, in particular the potassium perchlorate, as well as the products derived from decomposition of said compounds by heating or electrolysis, can be valorized or subjected to industrial treatment for other purposes.

In conclusion, the water desalination method of the invention permits, at a first stage of the process, to effect removal of the dissolved chlorine ions. The thus obtained water may be used for various agricultural and industrial purposes. By an additional stage of the process, there may be obtained a sodium ion-depleted water which is slightly mineralized and definitively suitable for various domestic uses and for human consumption.

What we claim is:

1. A method for desalination of sea water, brackish waters or brines, utilizing:

a main electrochemical generator consisting of one or more units including respectively a $OH^-$ ion source cathode immersed in an electrolyte, a separator and an anode compartment through which the water to be desalinated flows in contact with an auxiliary electrode acting to collect the electric power produced by the generator, a unit for removing the chlorates and perchlorates formed in the main electrochemical generator, by mixing a potassium salt with the solution to be desalinated, then settling, filtration and separation of the insoluble compounds obtained, one or more additional electrochemical generators effecting removal of the alkaline and metal salts formed in the unit for removing chlorates and perchlorates, and using respectively a $OH^-$ ion source cathode immersed in an alkaline electrolyte, a separator and an anode compartment through which the solution to be desalinated flows in contact with an auxiliary electrode acting to collect the electric power produced by said generators, as well as the cells for settling, filtrating and separating the thus obtained insoluble componds, an auxiliary unit effecting recovery and decomposition of the various residual compounds obtained at the various desalination stages, and synthesis of the potassium salt used in the unit for removing the chlorates and perchlorates.

2. A desalination method according to claim 1, wherein said cathode of the main electrochemical generator and of the additional electrochemical generator or generators is made of a metal oxide consisting of cobalt oxide and/or nickel oxide and/or titanium oxide which is hydroxylated and deposited onto a substrate of expanded, rolled or sintered metal and can be regenerated by circulating or dissolving air or oxygen in the electrolyte.

3. A desalination method as set forth in claims 1 or 2, wherein removal of the chlorates and perchlorates formed in the main electrochemical generator is effected by mixing potassium bicarbonate and/or potassium carbonate and/or potassium sulphate with the solution to be desalinated.

4. A desalination method as set forth in claims 1, 2 or 3, wherein decomposition of the resulting precipitated persalts is effected by heating and/or electrolysis and/or under the action of hydrochloric acid.

5. A desalination method as set forth in claims 1, 2, 3 or 4 wherein the power consumed in the various units is wholly or partly supplied by the main electrochemical generator and/or the secondary electrochemical generator or generators.

* * * * *